United States Patent
Roos

(10) Patent No.: US 9,581,212 B2
(45) Date of Patent: *Feb. 28, 2017

(54) FORCE GENERATING DEVICE, IN PARTICULAR FOR A PARKING BRAKE, METHOD FOR OPERATING THE DEVICE AND SYSTEM HAVING THE DEVICE

(71) Applicant: BROSE FAHRZEUGTEILE GMBH & CO. KOMMANDITGESELLSCHAFT WUERZBURG, Wuerzburg (DE)

(72) Inventor: Stephan Roos, Wertheim-Hoehefeld (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 53 days.

This patent is subject to a terminal disclaimer.

(21) Appl. No.: 14/616,911

(22) Filed: Feb. 9, 2015

(65) Prior Publication Data
US 2015/0152929 A1 Jun. 4, 2015

Related U.S. Application Data

(63) Continuation of application No. PCT/EP2013/002364, filed on Aug. 7, 2013.

(30) Foreign Application Priority Data

Aug. 8, 2012 (DE) .................. 10 2012 015 709

(51) Int. Cl.
*F16D 65/16* (2006.01)
*B60T 7/10* (2006.01)
(Continued)

(52) U.S. Cl.
CPC ............. *F16D 65/16* (2013.01); *B60T 7/107* (2013.01); *B60T 11/046* (2013.01); *B60T 11/06* (2013.01);
(Continued)

(58) Field of Classification Search
CPC .. F16D 65/16; F16D 2121/24; F16D 2125/40; B60T 13/746; B60T 7/107; B60T 11/06; B60T 11/406
(Continued)

(56) References Cited

U.S. PATENT DOCUMENTS 3,161,074 A * 12/1964 Korthaus ................. B61G 9/18
477/23
8,662,263 B2 * 3/2014 Deutloff .................. F16D 65/14
188/162
(Continued)

FOREIGN PATENT DOCUMENTS

DE 10361127 A1 7/2005
DE 10356096 B4 5/2007
(Continued)

*Primary Examiner* — Xuan Lan Nguyen
(74) *Attorney, Agent, or Firm* — Lawrence A. Greenberg; Werner H. Stemer; Ralph E. Locher

(57) ABSTRACT

A device for generating a force applied to a component includes a force generating element supported on a resilient support device having first and second, or only a second, spring elements in series in a force transmission chain being stressed during force transmission. The first spring element is less stiff than the second. The first spring element is stressed by a first supporting force over a first spring travel. A spring travel exceeding the first spring travel and a force absorption by the first spring element exceeding the first supporting force are prevented by a first mechanical engaging device. The second spring element is formed by a spring module having a second spring stressed by a second mechanical engaging device with a second supporting force (Continued)

permitting the second spring to only be further stressed when exceeding the second supporting force. A travel sensor detects displacement of the force generating element.

16 Claims, 6 Drawing Sheets

(51) Int. Cl.
  *B60T 11/04* (2006.01)
  *B60T 11/06* (2006.01)
  *B60T 13/74* (2006.01)
  *F16D 121/24* (2012.01)
  *F16D 125/40* (2012.01)

(52) U.S. Cl.
  CPC ........ *B60T 13/746* (2013.01); *F16D 2121/24* (2013.01); *F16D 2125/40* (2013.01)

(58) Field of Classification Search
  USPC ........................................................ 188/156
  See application file for complete search history.

(56) References Cited

U.S. PATENT DOCUMENTS

| | | |
|---|---|---|
| 2010/0219029 A1 | 9/2010 | Deutloff et al. |
| 2013/0213034 A1 | 8/2013 | Leiber |
| 2015/0183413 A1* | 7/2015 | Roos ........................ B60T 7/107 188/156 |
| 2015/0184713 A1* | 7/2015 | Roos ........................ B60T 7/085 188/158 |

FOREIGN PATENT DOCUMENTS

| | | |
|---|---|---|
| DE | 102010050132 A1 | 5/2012 |
| JP | 2008309516 A | 12/2008 |
| KR | 20060128935 A | 12/2006 |
| KR | 20110062633 A | 6/2011 |
| WO | 2007087914 A1 | 8/2007 |

\* cited by examiner

FORCE GENERATING DEVICE, IN PARTICULAR FOR A PARKING BRAKE, METHOD FOR OPERATING THE DEVICE AND SYSTEM HAVING THE DEVICE

CROSS-REFERENCE TO RELATED APPLICATION

This is a continuation, under 35 U.S.C. §120, of copending International Application No. PCT/EP2013/002364, filed Aug. 7, 2013, which designated the United States; this application also claims the priority, under 35 U.S.C. §119, of German Patent Application DE 10 2012 015 709.6, filed Aug. 8, 2012; the prior applications are herewith incorporated by reference in their entirety.

BACKGROUND OF THE INVENTION

Field of the Invention

The invention relates to the field of mechanisms and mechanical engineering, and can be used to particular advantage in the automotive sector. It relates, in particular, to applications with parking brakes, which can be motor-driven, for motor vehicles. The invention relates, in particular, to a force generating device, a method for operating the device and a system having the device.

Corresponding devices for generating force or defining force may, however, also be used for other applications, for example mechanical presses and hydraulic tools. The invention makes it possible for a force to be generated and exerted on a component in a controlled manner, in which the force can be set and controlled in an effective way. The invention makes a device for generating a force particularly easily controllable.

In the case of the device according to the invention being used as an actuator for a parking brake, it replaces a handbrake lever of a motor vehicle. The device makes it possible for a defined force to be imparted, for example to a brake cable pull or brake cable. In this case, it can be ensured that a defined minimum force is applied, while a likewise defined maximum force is not exceeded. This is necessary firstly in order to attain a reliable braking action and secondly in order to prevent force-transmitting components from being destroyed.

German Patent DE 103 61 127 B4, corresponding to U.S. Pat. No. 8,662,263, discloses an actuator in which the applied force is performed by using a travel measurement of a spring element which is elastically deformed in the force transmission chain. The travel measurement itself is realized through the detection of the movement of a magnet by using a Hall sensor. If the characteristic curve of the sensor/magnet system is known, the relative position and thus the position of the actuator, the deformation of the spring element and thus the acting force can be determined. For that purpose, the characteristic curve of the magnet sensor is conventionally evaluated by using a processor.

German Patent DE 103 56 096 B4 discloses the force measurement indirectly by using the measurement of the current of an electric motor drive for a force generating device. Such indirect force detection normally only attains a low degree of accuracy.

German Patent Application DE 10 2010 050 132 A1, corresponding to U.S. Patent Application Publication No. 2013/0213034, discloses a pedal travel measurement system having two sensors of redundant configuration, in such a way that detection errors can be easily identified.

SUMMARY OF THE INVENTION

It is accordingly an object of the invention to provide a force generating device, a method for operating the device and a system having the device, which overcome the hereinafore-mentioned disadvantages of the heretofore-known devices, methods and systems of this general type and in which the device is firstly reliable and secondly particularly easy to control.

With the foregoing and other objects in view there is provided, in accordance with the invention, a device for generating a force applied to a component, in particular to a tensile element, in a first direction, the device comprising a force generating element supported on a support device which exhibits limited resilient flexibility and which has at least one spring element, the at least one spring element is disposed in the force transmission chain and can be placed under stress during the transmission of force, the spring element is formed by a spring module in which a spring is prestressed by a mechanical engagement device with a predetermined support force in such a way that the spring can be placed under further stress only when the predetermined support force has been exceeded, and a travel sensor, in particular in the form of a switch, is provided for indirectly or directly detecting a displacement of the force generating element.

The spring is prestressed in the direction in which it is loaded during the generation of force, in such a way that, during the generation of force, the spring is initially not deformed until the externally acting support force has reached the magnitude of the prestress force in the spring module. From that force level onward, the spring is deformed. The deformation is detected and signaled by the travel sensor. This may take place by way of continuous travel detection or, more simply, by way of a signal which is generated by a position switch and which signals a deformation of the spring and thus outputs the information that the generated force has reached the level of a predetermined support force.

In accordance with another advantageous feature of the invention, the spring of the spring element is prestressed with at least 50%, in particular at least 90%, of the maximum force that can be generated by the force generating element.

In accordance with a further advantageous feature of the invention, the spring of the spring element is prestressed with the maximum force that can be generated by the force generating element, minus a tolerance value which corresponds to the admissible deviation from the setpoint force in the system.

The prestress of the spring may lie approximately at the level of the force to be generated by the force generating element and support force, or below the level by a tolerance value. Then, the attainment of the minimum force to be generated is signaled by the travel sensor upon the commencement of the deformation of the spring.

In accordance with an added advantageous feature of the invention, the force generating element can be driven by using an electric drive motor which is controllable in a manner dependent on a signal from the travel sensor and which is stopped if a force detected by the travel sensor reaches a setpoint force. This is achieved, for example, as stated above, in that the spring of the spring element is prestressed with the setpoint force minus a tolerance value which corresponds to the admissible deviation from the setpoint force in the system. The commencement of the movement of the spring then signals, by way of the travel sensor, the attainment of the setpoint force, and this can be converted into a signal for stopping the drive motor.

In accordance with an additional advantageous feature of the invention, the tolerance value amounts to less than 10% of the setpoint force, in particular less than 5% of the setpoint force.

In accordance with yet another advantageous feature of the invention, the spring of the spring element is in the form of a compression spring.

A compression spring can be prestressed particularly easily and with little space requirement in a spring element as a spring pack.

In accordance with yet a further advantageous feature of the invention, the spring of the spring element is in the form of a helical spring or a plate spring.

With the objects of the invention in view, there is also provided an advantageous method for the operation of a device, which comprises placing the spring of the spring element under further stress in the event that the predetermined support force is exceeded, and signaling the placing of the spring element (7) under further stress by a signal from the travel sensor.

With the objects of the invention in view, there is furthermore provided a device for generating a force applied to a component, in particular to a tensile element, in a first direction, the device comprising a force generating element supported on a support device which exhibits limited resilient flexibility and which has at least two spring elements, the at least two spring elements are disposed in series in the force transmission chain and can be placed under stress during the transmission of force. In this case, a first spring element has a lower stiffness than a second spring element, and the first spring element can be placed under stress under the action of a first support force over a first spring travel. Furthermore, a spring travel beyond the first spring travel, and an absorption of force by the first spring element over and above the first support force, are prevented by a first mechanical engagement device. Furthermore, the second spring element is formed by a spring module in which a second spring is prestressed with a second support force by a second mechanical engagement device, in such a way that the second spring can be placed under further stress only when the second support force has been exceeded. Furthermore, a travel sensor is provided for indirectly or directly detecting a displacement of the force generating element.

The device according to the invention serves, for example, for generating a force applied to a brake cable pull in a motor vehicle, which in this context forms the tensile element on which the force is exerted. The force generating element may typically be constructed as a structure which has a spindle and a spindle nut. In this case, the spindle nut is supported in an axial direction and can be driven in a circumferential direction, whereas the spindle is displaceable in its axial direction by rotation of the spindle nut in order to loosen or tighten a brake cable pull fastened thereto.

The spindle nut is supported in an axial direction on a support device which partially deflects elastically under the action of the generated force and has two spring elements that can be placed under stress. Each of the spring elements has a spring, in such a way that altogether, a first spring of the first spring element and a second spring of the second spring element are provided. The first spring, which is for example supported on a housing, is substantially relaxed when no tensile force is applied to the tensile element.

The first spring is the weaker of the two springs and, upon the commencement of the generation of force, is stressed, for example compressed, for example in the force range between 100N and 150N by the pressure exerted by the spindle nut, so as to have traveled through a first spring travel. The first spring travel may, for example, amount to 2 mm. After traveling through this travel, it is possible according to the invention for the force generating device itself, that is to say, for example, the spindle nut or a further element connected thereto, to abut against a fixed stop. The first spring is then prestressed and absorbs a part of the axial force, but can be stressed no further, in such a way that forces over and above this are absorbed by the corresponding stop which forms the first mechanical engagement device. A switch on the travel sensor, for example, may be used to detect when the first spring travel, for example 2 mm, has been traveled through. In this context, it is advantageous that, overall, only the fact that the first spring travel has been traveled through needs to be detected and signaled as a fact. In other words, continuous travel measurement during the first spring travel is not necessary.

If the force generated by the force generating device continues to increase, increased tension is exerted on the tensile element. However, due to the strength of the elements provided in the support device, it is initially the case therein that no component or the like moves, so that the force generating device itself also remains stationary relative to the support device.

The second spring element has a prestressed second spring which, due to the increased support force of the force generating device, can initially not be placed under any further stress up until the point at which the support force reaches the level of the second support force, which in turn corresponds to the preload force of the second spring element, that is to say the force with which the second spring in the second spring element is prestressed. In the event of the force level being exceeded, the second spring can be placed under further stress, in such a way that, in the event of a further increase of the force, for example between 1425 N and 1575 N, a further spring travel is traveled through at the second spring element, that is to say the support device deflects by the further spring travel, and the force generating device moves further by the corresponding spring travel.

The second travel of the force generating device can be detected by using the travel sensor. In this case, too, it is necessary merely to detect and signal the fact that the travel has been traveled through, in such a way that the detection may also be effected by using a simple switch. Instead of the switch for the detection of the first and second spring travel, it is also possible to use continuous travel measurement, but equipping the travel sensor with two simple switches represents the most economical embodiment. The corresponding signals of the travel sensor may be utilized, for example, for deactivating the drive of the spindle nut when the second support force level is exceeded (since the desired force level of the brake cable pull has been reached), and for enabling the drive of the spindle nut during the release of the brake to be stopped when the tensile force level has fallen to a range around 100 N and the first spring is relaxed. In this way, control of the drive of the spindle nut is particularly simple.

In other words, the invention can accordingly be seen in the fact that, at a medium force level of the force generating device, in the case of a parking brake, two prestressed springs are provided in the support device, in each case one of which travels through a limited spring travel, which can be detected by using in each case one switch or one proximity switch, when a lower or upper force threshold value is reached.

The switches may, for example, be in the form of Hall sensors which detect the relative movement of a magnet. It is, however, also possible for optical switches, for example in the form of light barriers or light-sensitive semiconductor components, to be provided, which detect moving scale ranges of different brightness or of different transparency.

In accordance with another advantageous feature of the invention, the first and second spring elements are in the form of compression spring elements. Advantages attained by this feature are, in particular, that only minor settling phenomena can be expected in the mechanical force transmission chain, and that the spring elements function reliably over a very long time period even under adverse environmental conditions such as temperature and humidity fluctuations.

In accordance with a further advantageous feature of the invention, it is also conceivable for the first and second spring elements to be in the form of tension spring elements. This may be expedient, for example, if a parking brake is actuated by using a thrust element instead of a cable pull. The function of the spring elements is then substantially the opposite of the embodiment using compression spring elements.

In accordance with an added advantageous feature of the invention, the first and second springs are each in the form of helical springs. However, the use of spiral springs or other types of spring elements, for example leaf springs, plate springs or elastomer spring elements in block form, is also conceivable.

In accordance with an additional advantageous feature of the invention, the first mechanical engagement device is formed by a stop which is abutted against by an element disposed in the force transmission chain between the force generating element and the first spring element after the first spring travel has been traveled through. This has the result that, in the event of an increase of the force generated by the force generating element, the first spring is initially placed under stress, and that, after the first spring travel has been traveled through, it is not possible for the first spring to be placed under any further stress due to the abutment of the element adjacent the first spring against the fixed stop. Any force over and above this is absorbed not by the first spring but by the stop, in such a way that the first spring and the stop are connected mechanically in parallel with respect to one another.

In accordance with yet another advantageous feature of the invention, the second spring element has a spring, in particular a helical spring, which is prestressed between two face-side retention elements. In this case, the two face-side retention elements are displaceable towards one another, counter to the force of the second spring, after the second support force has been exceeded.

The second spring has a significantly stronger and more rigid form than the first spring. In the force transmission chain within the support device, the second spring element acts as a spring module initially as a solid, inflexible block, until the force level of the preload force—also referred to as a second support force—is reached. When the support force exceeds the level, the second spring is placed under further stress, that is to say is compressed further in the case of a compressible spring or is expanded further in the case of a prestressed tension spring.

If the second spring element is implemented by using a helical spring in the form of a compression spring, the second spring is typically prestressed, on a spring peg or in a spring sleeve, between two end stops. In this case, the end stops are displaceable towards one another in the axial direction of the helical spring when the second support force is exceeded. For example, a stop ring or a face-side stop plate may be guided in axially movable fashion in a spring sleeve or on a spring peg and restricted in terms of movement at one side by a fixed stop. The spring sleeve or the spring peg of the second spring may be supported by using a face-side end plate within the support device directly on the first spring.

In accordance with yet a further advantageous feature of the invention, the force generating device has a spindle displaceable in its axial direction and has a rotatably mounted spindle nut, wherein the spindle nut is supported on the support device. Other force generating devices are also conceivable, for example an expandable hydraulic plunger or a telescopically extendable toothed rack which can be driven by using gearwheels.

In accordance with yet an added advantageous feature of the invention, if the force generation is implemented with the participation of a spindle nut, the latter can advantageously be supported relative to the support device by using an axial bearing in the form of a rolling bearing. The rolling bearing may, for example, be in the form of a needle-roller bearing or in the form of a ball bearing.

In accordance with yet an additional particularly advantageous feature of the invention, the support device is disposed on a counterbearing formed, in particular, by a housing which accommodates the support device, on which counterbearing the first spring element, and in the event of the first support force being exceeded, also the second spring element, are supported. A housing of this type may, for example, be in the form of a cast metal housing or of a sheet-metal housing of strong construction. The housing may accommodate not only the force generating device and the support device but also a drive device for the force generating device, for example with a motor and a gearing, for driving a threaded spindle.

In accordance with again another advantageous feature of the invention, the travel sensor has at least one sensor element and at least one encoder element which are movable relative to one another and of which one is indirectly or directly connected to the force generating element, whereas the respective other is connected to the counterbearing. It is thus possible by using the travel sensor to detect the relative movement between the force generating device and the counterbearing, which is a measure of the stress of the support device and of the first and second spring elements, and thus of the generated force.

By using the basic concept of the invention, it is possible in conjunction with a travel sensor of this type to detect the passing of a travel mark only in a defined range corresponding to a low generated force and/or in a second force range which corresponds to a relatively high force—specifically advantageously the maximum force level to be generated by the force generating device. It is particularly advantageously the case that either two encoder elements or one sensor element or two sensor elements and one encoder element are provided, in such a way that both the attainment of the low force level (first support force) and the attainment of the second force level (second support force) can each be separately detected.

In accordance with again a further advantageous feature of the invention, in this respect, it is advantageously provided that the travel sensor is provided for outputting a first signal when the force generating element has traveled through the first spring travel and for outputting a second signal when the force generating element has traveled through a further travel after the second support force has been reached.

With the objects of the invention in view, there is additionally provided not only a device of the above-described type but also a method for operating a device of this type, which comprises, during the generation of a force, initially placing the first spring element under stress over the first spring travel, until a spring travel beyond the first spring travel and an absorption of force by the first spring element over and above the first support force are prevented by a first mechanical engagement device, wherein the second spring is thereupon placed under further stress in the event of the second support force being exceeded, and wherein the placing of the first spring element under stress and the placing of the second spring element under further stress are signaled by a respective signal from the travel sensor.

In the range between exceeding the level of the first support force and attaining the second support force, further movements of the support device are practically negligible. Accordingly, in this force range, the force generating device moves to a negligibly small extent, despite the increase in generated force.

With the objects of the invention in view, there is concomitantly provided a system comprising a device of the above-described type, and a travel sensor connected to a control device which controls not only a drive of the device according to the invention but also another assembly.

By virtue of the fact that it is not necessary for data regarding the movement of the force generating device to be detected and evaluated continuously, for example on the basis of different measured magnetic field strengths, in the travel sensor, but in the minimal case only a first signal is output when the first support force level is reached and a second signal is output when the second support force level is reached, the processing of the travel signals and thus of the information regarding the generated force is simplified in such a way that it does not need to be performed at the travel sensor by using a separate microcontroller or microprocessor. Rather, the small amount of data that arises can be jointly taken on by a local unit, which is separate from the device for force generation, and which has a dedicated processor or microcontroller. The data can be transported between the device for force generation and the data processing device over electrical or optical data lines.

Other features which are considered as characteristic for the invention are set forth in the appended claims.

Although the invention is illustrated and described herein as embodied in a force generating device, a method for operating the device and a system having the device, in particular, for a parking brake, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
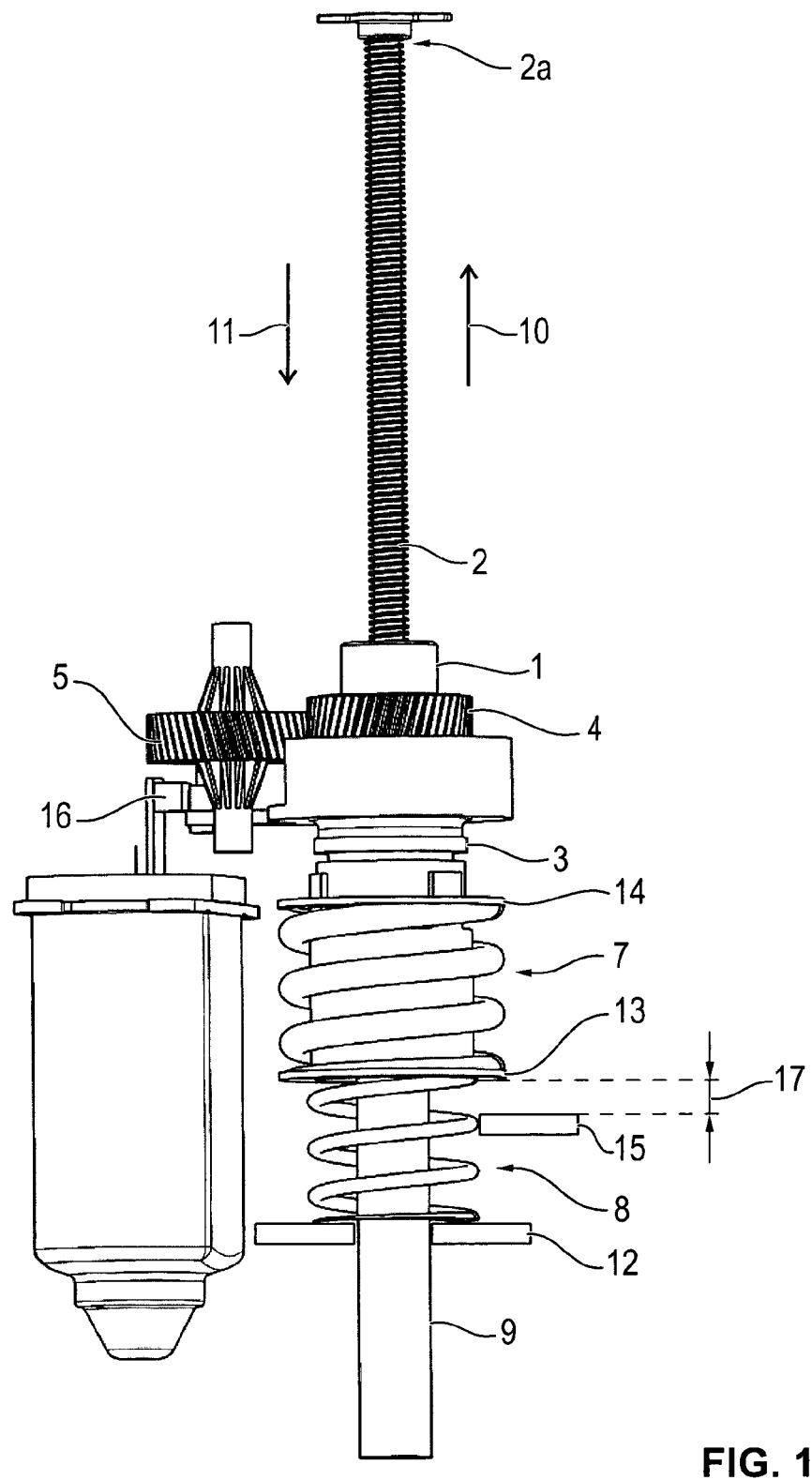
FIG. 1 is a diagrammatic, side-elevational view of a device for generating a force, having a spindle, a spindle nut, two coaxial spring elements and a drive.

Referring now to the figures of the drawings in detail and first, particularly, to FIG. 1 thereof, there is seen a side view of a spindle nut 1 which acts as force generating element interacting with a spindle 2. The spindle nut 1 is mounted so as to be rotatable and is supported on an axial bearing 3. The outer side of the spindle nut 1 carries a helically toothed gearwheel 4 which can be driven by using a drive gearwheel 5 and a non-illustrated drive motor.

The axial bearing 3 is typically in the form of a rolling bearing and is supported on a second spring element 7, which in turn, in the illustrated state, is supported on a first spring element 8 in the axial direction 11. The first spring element 8 is in the form of a helical spring which coaxially surrounds the spindle 2 or its displacement travel during rotation of the spindle nut 1.

Reference numeral 9 denotes a sleeve which surrounds and protects the spindle 2 in the region of the spring elements. A tensile element in the form of a cable pull is attached to a second end 2b (not illustrated in FIG. 1) of the spindle 2 which is situated opposite a first end 2a. The cable pull actuates a non-illustrated parking brake of a vehicle by using a pulling movement when the spindle 2 is displaced.

If the spindle 2 moves in the direction of an arrow 10, the tensile element is pulled, or the tensile force is increased. In this case, a force acts on the spindle 2 and the spindle nut 1 in the direction of the arrow 11.

In the event of a movement of the spindle 2 in the direction of the arrow 11, the pulling action is eliminated, and the tensile force is reduced.

During the course of the force generation, the spindle nut 1 is supported on the first spring element 8 and on the second spring element 7. The first spring element 8 is in the form of a spring which is softer, with a lower spring constant, than the spring of the second spring element 7, so that the first spring 8 is compressed first, and to a greater extent than the spring of the second spring element 7. The first spring 8 is supported on a first stop 12 which forms, for example, a part of a housing which is not illustrated in any more detail in FIG. 1.

In the case of a low tensile force being generated, and a corresponding support force being applied by the first spring 8, the latter is compressed to an extent by virtue of the second spring element being moved, undeformed, toward the first spring 8. When the first spring travel has been traveled through, a first face-side or end retention element 13 of the second spring element 7 abuts against a static second stop 15. At this point in time, a second face-side or end retention element 14 of the second spring element 7 also moves in the direction of the arrow 11, without the second spring element 7 being compressed or expanded in the axial direction of the spring.

Correspondingly, the axial bearing 3 moves to an extent, typically in the region of 2 mm, in the direction of the arrow 11, in such a way that the spindle nut 1 also performs the movement. The toothing of the gearwheels 4 and 5 permits such a relative movement of the two gearwheels with respect to one another in the axial direction 11.

If, by further rotation of the spindle nut 1, the tensile force is increased, the first spring 8 is not compressed any further because the first face-side retention element 13, which together with the second mechanical stop 15 forms a first mechanical engagement device, abuts against a fixed stop. The first spring 8 does not absorb any further forces beyond the corresponding partial compression.

With a further increase in the tensile force or the support force, a further movement in the axial direction takes place only when the second spring element 7 is compressed in the axial direction when the level of the second support force is reached.

This point will be discussed in more detail further below.

In FIG. 1, reference numeral 16 denotes a travel sensor which has at least one element that is static in the axial direction relative to the spindle nut 1. A further non-illustrated element of the travel sensor 16 moves in the axial direction with the spindle nut 1, in such a way that the axial movement of the spindle nut can be detected by a relative movement of the two parts of the travel sensor relative to one another.

In FIG. 1, the travel through which the first face-side retention element 13 of the second spring element 7 travels in order to reach the second stop 15 is denoted separately by reference numeral 17. This travel forms the first spring travel.

Figures 2, 3:
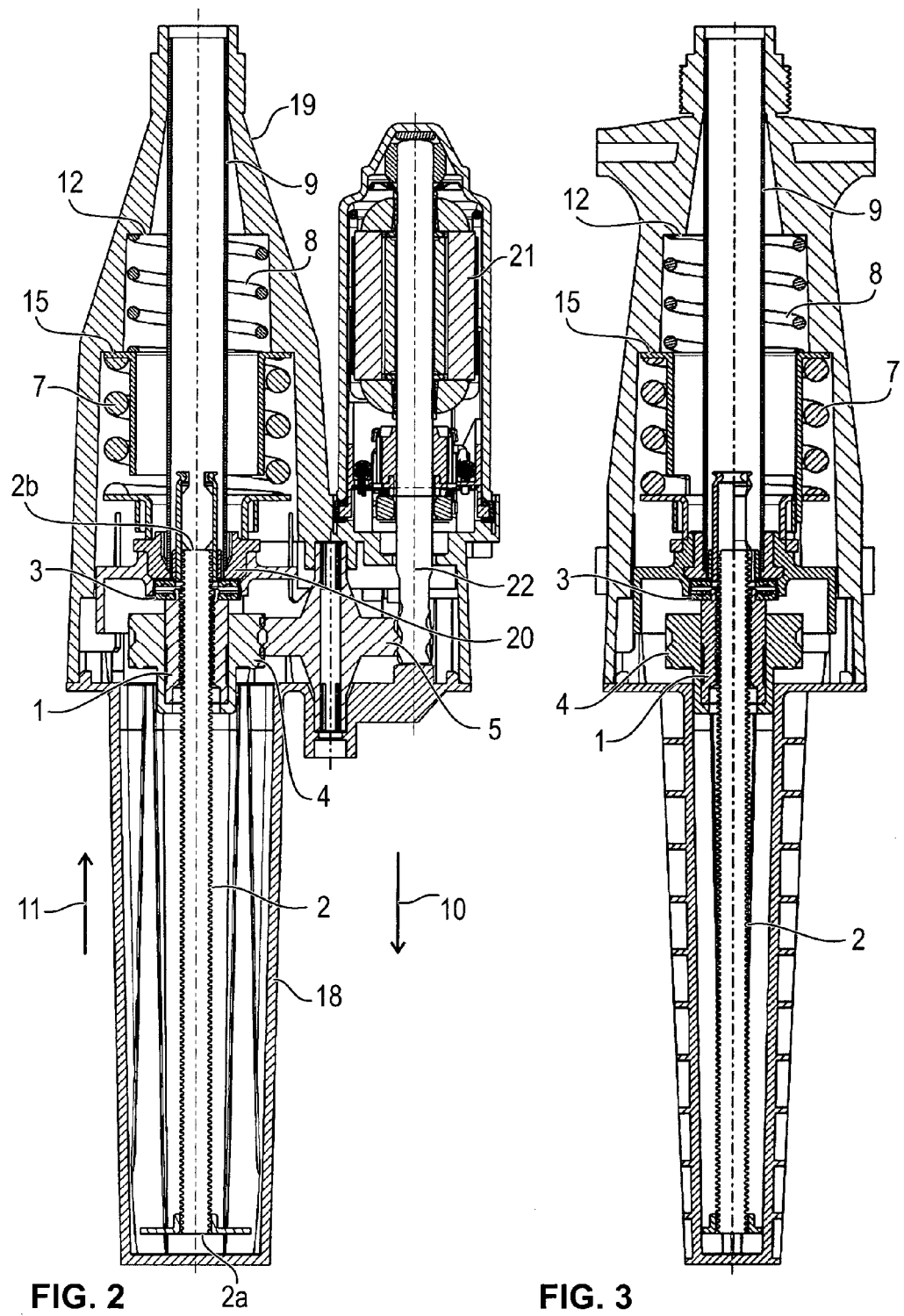
FIG. 2 is a longitudinal-sectional view of a configuration according to FIG. 1, with a housing.
FIG. 3 is a further longitudinal-sectional view of a configuration according to FIG. 1, in a section plane rotated in relation to that of FIG. 2.

FIG. 2 shows, in a longitudinal section, a spindle 2 with a spindle nut 1 which is guided rotatably thereon and which in turn is supported in the direction of the arrow 11 on an axial bearing 3. The second end 2b of the spindle 2 is connected in a non-illustrated manner to a cable pull, and exerts a tensile force on the latter in the direction of the arrow 10. The tensile force is increased or reduced by rotating the spindle nut 1, so that if a tensile force is applied, the spindle nut 1 is supported, with a support force being generated, on a housing 18, 19 through the axial bearing 3. The axial bearing 3 is in this case supported initially against a support ring 20, which in turn is supported relative to the second face-side retention element 14 of the second spring element 7. The second spring element 7 is in turn supported against the first spring element 8, or against the first stop 15 of the housing 19 after the first support force has been reached. The first spring element 8 is in turn supported on the first stop 12 of the housing 19.

Furthermore, in FIG. 2, a drive motor 21 is illustrated which is in the form of an electric motor and which drives the drive gearwheel 5 through a shaft 22.

In FIG. 3, the parts which have been described in conjunction with FIG. 2 are illustrated in a sectional view in a direction which is rotated in relation to that in FIG. 2. In FIG. 3, identical parts are denoted by the same reference signs.

Figure 4:
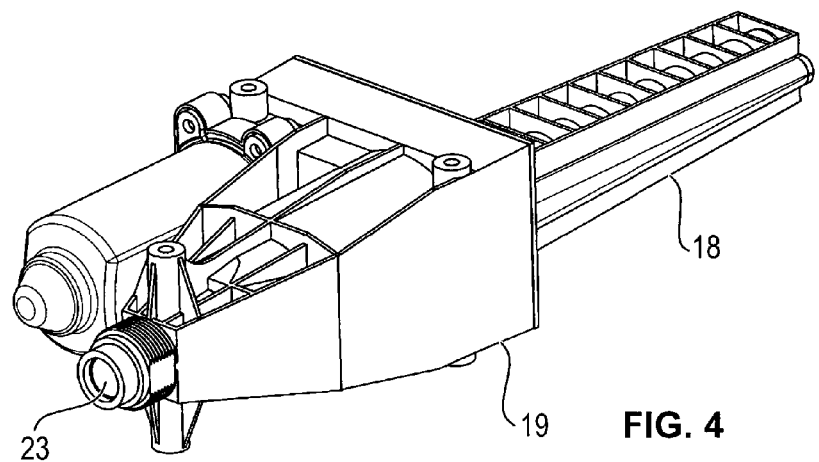
FIG. 4 is a perspective view of a housing of a device for generating a force according to FIGS. 2 and 3.

FIG. 4 is a three-dimensional view showing the housing 18, 19 of the device for generating a force, having an opening 23 from which the non-illustrated cable pull normally emerges.

Figure 5:
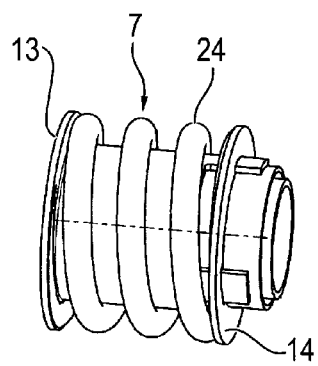
FIG. 5 is a perspective view of a second spring element.
Figure 6:
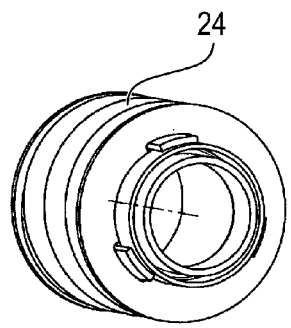
FIG. 6 is a perspective view of the second spring element of FIG. 5 from a different viewing angle.
Figure 7:
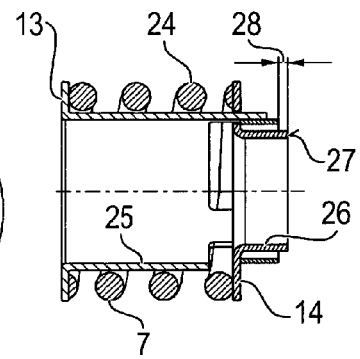
FIG. 7 is a longitudinal-sectional view of a second spring element according to FIGS. 5 and 6.

FIGS. 5 and 6 are three-dimensional views and FIG. 7 is a longitudinal-sectional view showing a second spring element 7 with a second spring 24 which is in the form of a helical spring mounted on a spring peg 25. The spring peg 25 has a first face-side or end retention element 13 and a second face-side or end retention element 14. The first face-side retention element 13 is a flange of the peg 25 connected fixedly to the latter in the exemplary embodiment. The spring 24 is supported in an axially fixed manner on the flange 13.

At the other side, the spring 24 is pre-compressed, and thus prestressed, between the first face-side retention element/flange 13 and the second face-side retention element 14. The second face-side retention element 14 in this case is in the form of a ring which is displaceable in the axial direction in relation to the first face-side retention element 13 and which is fixedly connected to a pipe stub 26 which has a face surface 27. The face or end surface 27 forms a counterbearing for the axial bearing 3. By exertion of pressure by the axial bearing 3 against the face surface 27, the pipe stub 26 can be displaced toward the first face-side retention element 13, when the second support force is exceeded, with the spring 7 being further compressed.

The second spring element 7 may be constructed in such a way that the axial bearing 3, when supported against the pipe stub 26 after displacement of the pipe stub by a second spring travel in the direction of the first face-side retention element 13, abuts against the peg 25 or the face-side continuation thereof, in such a way that the further compression of the second spring 24 is restricted to a second spring travel. The second spring travel corresponds to the maximum possible stroke during the further compression of the second spring element, which is illustrated in FIG. 7 and denoted by reference numeral 28.

Figure 8:
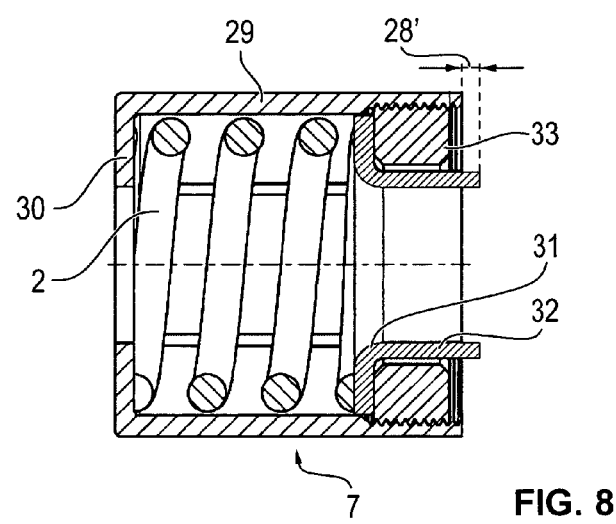
FIG. 8 is a longitudinal-sectional view of a further embodiment of a second spring element with an outer spring sleeve.

FIG. 8 is a longitudinal section which shows a further embodiment of the second spring element, in which the second spring 24 is pre-compressed in a sleeve 29 between an inner flange 30 of the sleeve, which forms the first face-side retention element, and a press-in ring 31, which forms the second face-side retention element, wherein the press-in ring 31 is connected to a pipe stub 32 which protrudes beyond the contour of the sleeve 29 at the face side by a stroke 28', and which, when subjected to load by the axial bearing 3, can be pushed into the sleeve 29, for further compression of the second spring 24, by the stroke 28'. The press-in ring 31 can, together with the pipe stub 32, be screwed into the sleeve 29, and prestressed and fixed therein, by using a screw connection ring 33.

Figure 9:
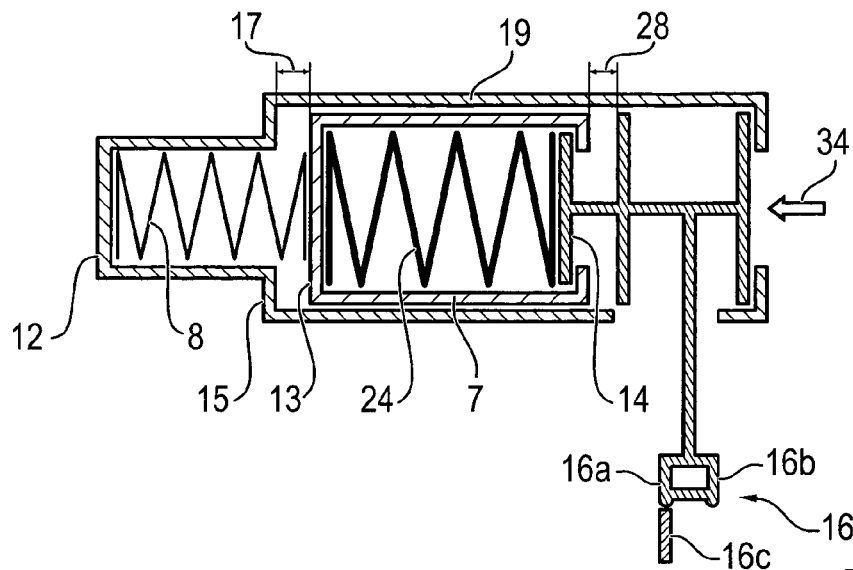
FIG. 9 is a schematic, longitudinal-sectional view of a device for generating a force for the purpose of explaining the operating principles, in a state in which practically no force is generated.
Figure 10:
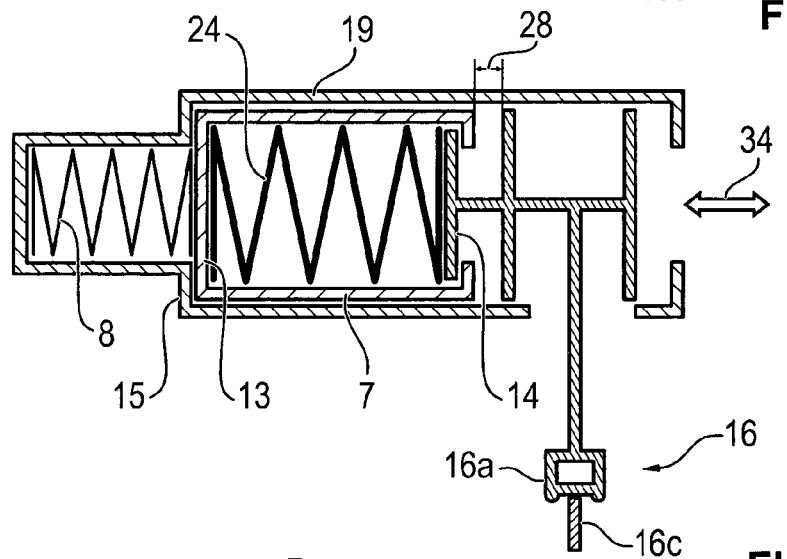
FIG. 10 is a view according to FIG. 9, in a state in which a medium force is generated.
Figure 11:
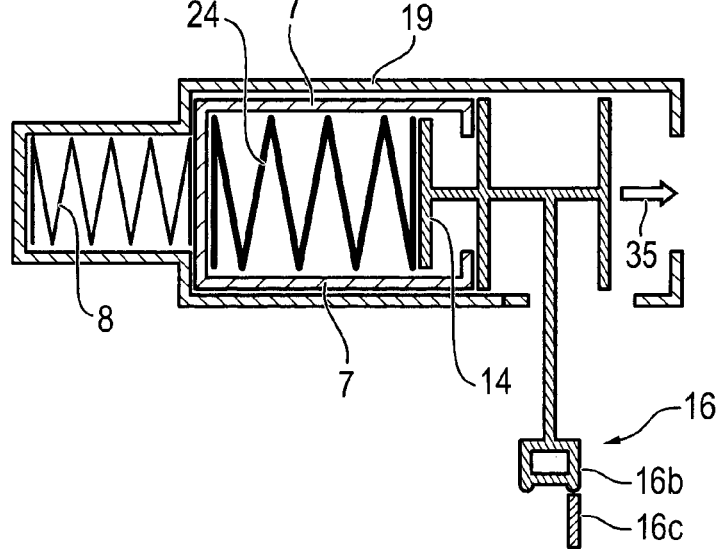
FIG. 11 is a view similar to FIGS. 9 and 10, in a state in which a high force is generated.

FIGS. 9, 10 and 11 illustrate schematic views of the invention with the first and second spring elements 8, 7 and with the force generating element and the travel sensor in three different positions.

The support force introduced by the force generating element/spindle nut 1 is indicated by an arrow 34. It acts on an axial bearing, which itself is not illustrated in FIGS. 9, 10 and 11 and which may be disposed at a suitable location between the point at which the support force 34 is introduced and the point at which it is supported on the second spring element 7. In the state illustrated in FIG. 9, the travel sensor 16 is illustrated in a position in which neither of two encoders 16a, 16b has passed a sensor element 16c. It is thus signaled that the level of the support force is practically equal to zero. If a support force 34 is now applied, it acts on the second face-side retention element 14 of the second spring element 7 and presses the entire second spring element 7, as an undeformed spring module, against the first spring 8. Since the first spring 8 is significantly weaker than the preload of the second spring element 7, the first spring 8, traveling through the first spring travel 17, is compressed until the second spring element 7 abuts against the stop 15 of the housing 19. In this case, the first spring 8 is supported on the first stop 12 of the housing 19. After the first spring travel has been traveled through, the position illustrated in FIG. 10 is assumed. The first encoder 16a has passed the sensor element 16c, in such a way that the fact that the first spring travel has been traveled through is signaled by the sensor element 16c. In the event of a further increase of the support force 34, a further travel is initially not traveled through. In the event of a further increase in support force, elasticity is possibly imparted by the non-illustrated force transmission elements, such as, for example, the cable pull. The position illustrated in FIG. 10 is assumed in a force range between, for example, approximately 100 N, the level of the first support force, and approximately 1500 N. In this case, the magnitude of 1500 N corresponds to the level of the second support force. If the level is exceeded as a result of a further increase of the support force, a movement of the second face-side retention element 14 of the second spring element 7 results in a further compression of the second spring 24, and thus in a second spring travel 28 being traveled through, as illustrated in FIG. 10. The end of the second spring travel is defined by the limitation of the further compression of the spring 24 and a stop on the second spring element 7. The limitation of the second spring travel has been explained in more detail, in particular, in conjunction with FIGS. 5 to 8.

In FIG. 11, it can be seen that, after the second spring travel 28 has been traveled through, the travel sensor 16 moves into a third state, in which the second encoder 16b has moved past or arrived at the sensor element 16c, so that the fact that the second spring travel 28 has been traveled through can be signaled. The sensor 16 can thus, in accordance with the exemplary embodiment shown, be constructed so as to merely signal the fact that the first spring travel 17 has been traveled through and the fact that the second spring travel 28 has been traveled through, by virtue of the encoders 16a, 16b passing the sensor element 16c. It is thus basically necessary for only two different signals to be output and identified and evaluated for the purposes of further control.

Upon the elimination of the tensile force and the support force, the spindle is moved in the direction of the arrow 35, and the states of FIGS. 9, 10 and 11 are passed through in sequence starting with FIG. 11, followed by FIG. 10 and finally FIG. 9. Finally, the fact that the first spring travel 17 has been traveled through is signaled, whereby the travel sensor outputs the signal that the first spring 8 has relaxed, the tensile force has been eliminated and the release of the parking brake has taken place, and the drive can be switched off. Conversely, in the case of the engagement of a parking brake, the corresponding signal for switching off a drive motor 21 of the spindle 1 is output after the second spring travel 28 has been passed through.

Figure 12:
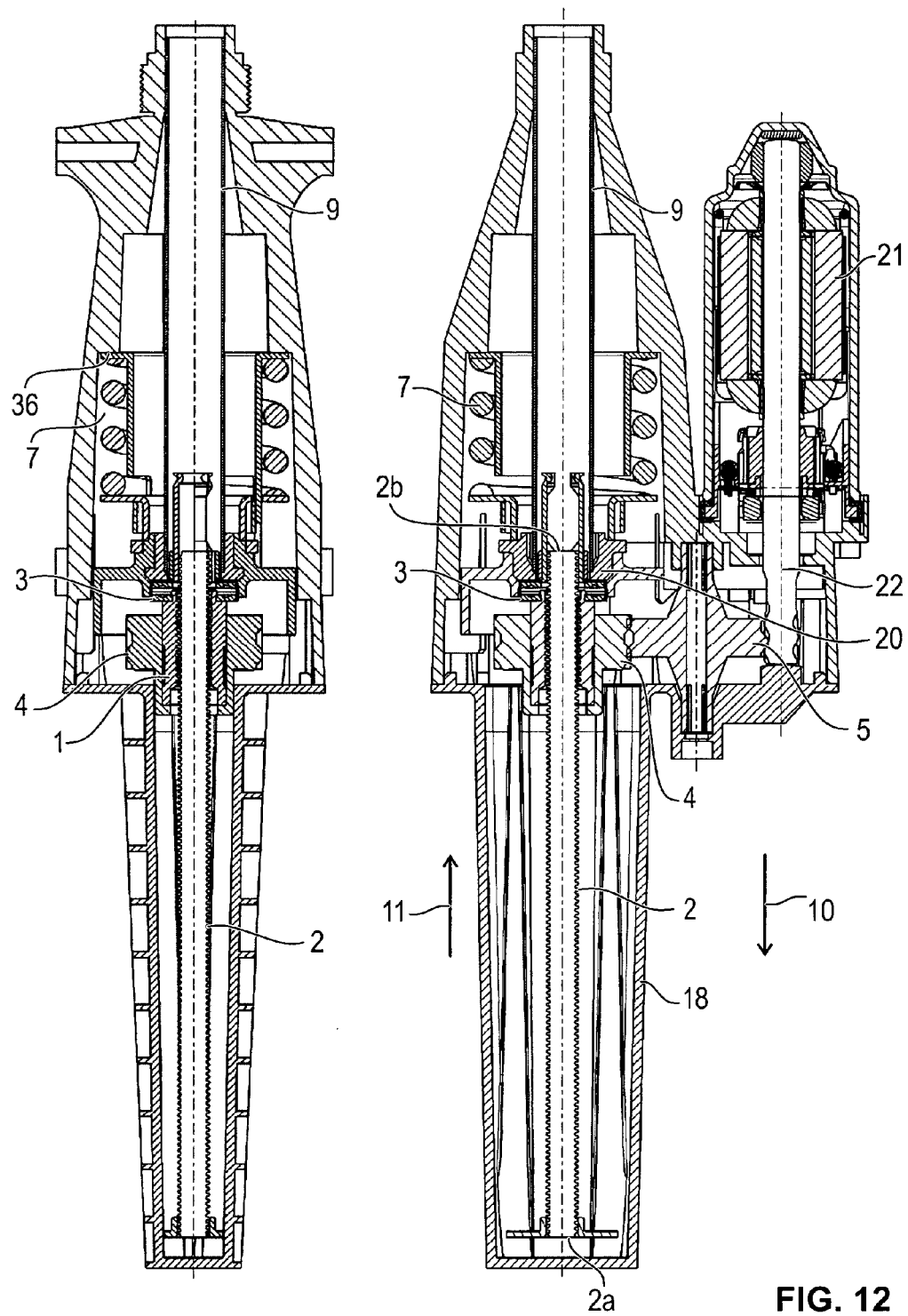
FIG. 12 is a longitudinal-sectional view of a device for generating a force, having a spindle, a spindle nut and a spring which is prestressed in a spring element.

FIG. 12 shows a device for generating a force, having a spindle 2 and a spindle nut 1 which is supported by using an axial bearing 3 on a support ring 20. The elements and the function are basically identical to those in the case of the structure illustrated in FIGS. 2 and 3, but the spring element 8 has been dispensed with. Only the travel of the second spring element 7, which indicates the attainment of the setpoint force, is measured by using a sensor. The travel of the spring element 7 may be measured, for example, by using a magnet which is fastened to the spring element or, for example, to the support ring 20 in which the magnet interacts with a static sensor. Otherwise, the statements made in conjunction with FIGS. 1 to 3 likewise apply in this case.

Figure 13:
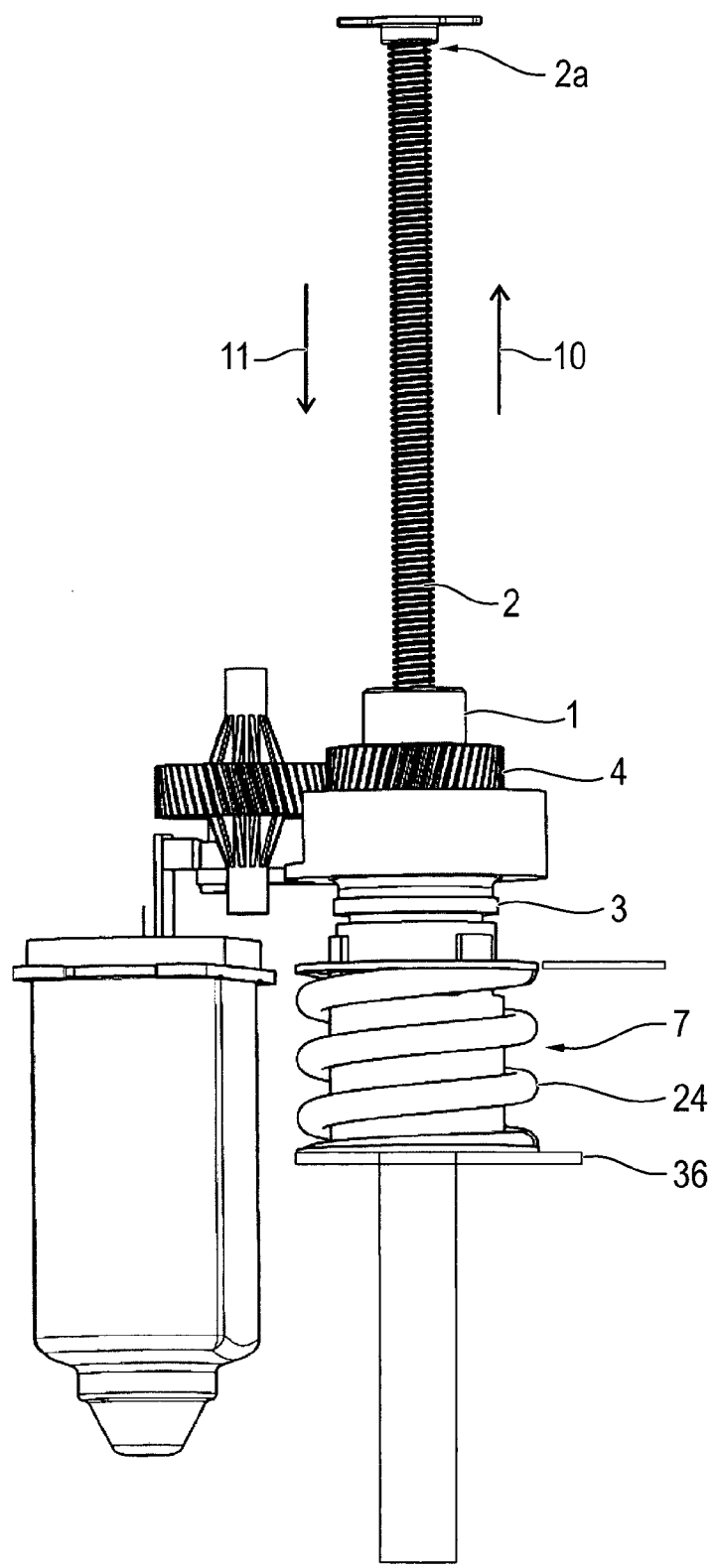
FIG. 13 is a side-elevational view of a device according to FIG. 12.

Like FIG. 12, FIG. 13 shows a structure which corresponds to the structure illustrated in FIG. 1, with the difference that, in the embodiment of FIG. 13, only a single spring element 7 with a spring 24 is provided. The spring element 7 corresponds to the structure shown in FIGS. 5, 6, 7 and 8.

In FIGS. 12 and 13, the spring element 7 bears directly against a stop 36. The structure illustrated in FIGS. 12 and 13 is adequate, in the case of a motor vehicle brake, for deactivating a drive motor by using a sensor when the setpoint braking force is attained.

Through the use of the invention described herein in its various embodiments, it is possible generally for the control of a parking brake, or of some other device that can be used for generating a force, to be simplified considerably, which is manifested in a cost reduction.

The invention claimed is:

1. A device for generating a force applied to a component or a tensile element in a first direction, the device comprising:
   a force generating element;
   a support device supporting said force generating element, said support device exhibiting limited resilient flexibility and having at least first and second spring elements disposed in series in a force transmission chain and configured to be stressed during a transmission of force, said first spring element having a lower stiffness than said second spring element;
   said first spring element configured to be stressed by a first support force over a first spring travel;
   a first mechanical engagement device preventing a spring travel exceeding said first spring travel and an absorption of force by said first spring element exceeding said first support force;
   said second spring element being formed by a spring module having a second spring;
   a second mechanical engagement device prestressing said second spring with a second support force for further stressing said second spring only upon exceeding said second support force; and
   a travel sensor indirectly or directly detecting a displacement of said force generating element.

2. The device according to claim 1, wherein said first and second spring elements are compression spring elements.

3. The device according to claim 1, wherein said first and second spring elements are tension spring elements.

4. The device according to claim 1, wherein said first and second springs are respective helical springs.

5. The device according to claim 1, which further comprises an element disposed in said force transmission chain between said force generating element and said first spring element, said first mechanical engagement device being formed by a second stop being abutted against by said element disposed in said force transmission chain after said first spring travel has been traveled through.

6. The device according to claim 5, wherein said element disposed in said force transmission chain is a first end retention element of said second spring element.

7. The device according to claim 1, wherein said second spring of said second spring element is prestressed between two end retention elements being displaceable towards one another counter to a force of said second spring, after said second support force has been exceeded.

8. The device according to claim 7, wherein said second spring is a helical spring.

9. The device according to claim 1, wherein said force generating device has an axial direction, a spindle displaceable in said axial direction and a force generating element formed by a rotatably mounted spindle nut, said spindle nut being supported on said support device.

10. The device according to claim 9, which further comprises an axial bearing formed by a rolling bearing supporting said spindle nut relative to said support device.

11. The device according to claim 1, which further comprises a counterbearing on which said support device is disposed.

12. The device according to claim 11, wherein said counterbearing is formed by a housing accommodating said support device, said first spring element being supported on said housing, and said second spring element being supported on said housing upon exceeding said first support force.

13. The device according to claim 1, which further comprises:
    a counterbearing on which said support device is disposed;
    said travel sensor having at least one sensor element and at least one encoder element being movable relative to one another;
    one of said at least one sensor element or said at least one encoder element being indirectly or directly connected to said force generating element; and
    the other of said at least one sensor element or said at least one encoder element being connected to said counterbearing.

14. The device according to claim 13, wherein said travel sensor is configured to output a first signal when said force generating element has traveled through said first spring travel and to output a second signal when said force generating element has traveled through a further travel after said second support force has been reached.

15. A method for operating a device for generating a force applied to a component or a tensile element in a first direction, the method comprising the following steps:
    supporting a force generating element by using a support device exhibiting limited resilient flexibility and having at least first and second spring elements disposed in series in a force transmission chain and configured to be stressed during a transmission of force, the first spring element having a lower stiffness than the second spring element;
    stressing the first spring element by a first support force over a first spring travel;
    preventing a spring travel exceeding the first spring travel and an absorption of force by the first spring element exceeding the first support force by using a first mechanical engagement device;
    providing the second spring element with a spring module having a second spring;
    prestressing the second spring of the second spring element with a second support force by using a second mechanical engagement device further stressing the second spring only upon exceeding the second support force;
    during a generation of force, initially stressing the first spring element over the first spring travel, until preventing a spring travel exceeding the first spring travel and an absorption of force by the first spring element exceeding the first support force by using the first mechanical engagement device; and
    indirectly or directly detecting a displacement of the force generating element by using a travel sensor and signaling the stressing of the first spring element and the further stressing of the second spring element by a respective signal from the travel sensor.

16. A system, comprising:
a device according to claim 1;
a drive motor driving said device; and
a control device connected to said travel sensor for controlling said drive motor and another assembly.

* * * * *